Dec. 27, 1960    C. G. SCHREYER    2,966,244
DEVICE FOR HOLDING AN AUTOMOBILE AGAINST MOVEMENT
Filed July 28, 1958    4 Sheets-Sheet 1
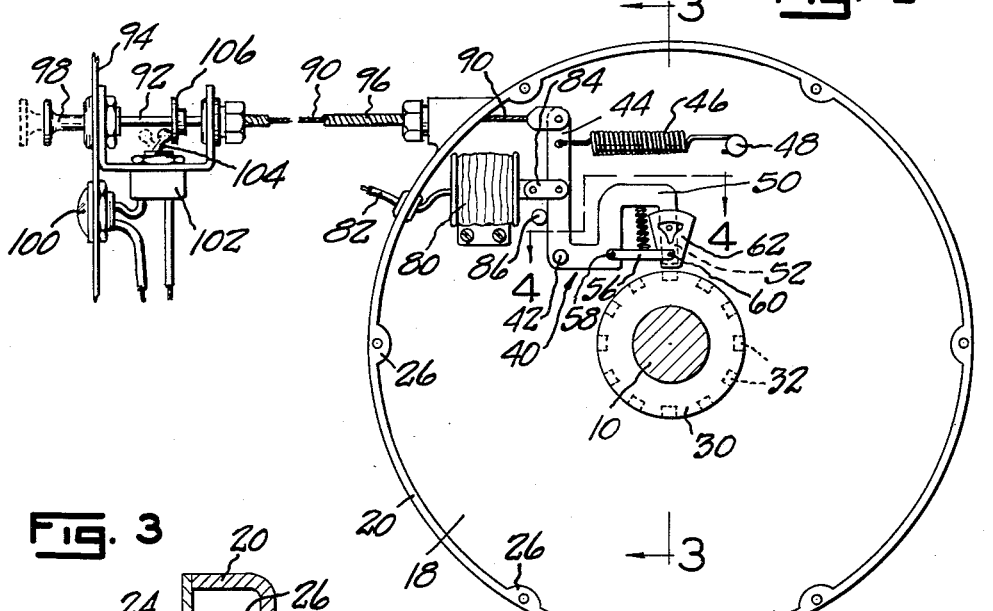
INVENTOR.
CHARLES G. SCHREYER
BY
Eugene C. Knoblock
ATTORNEY

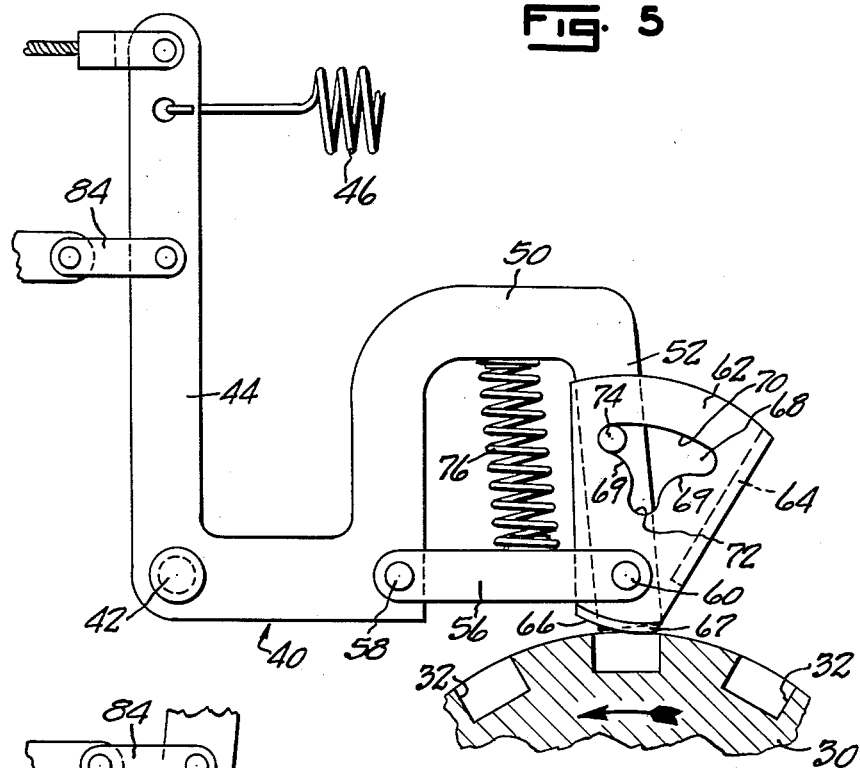
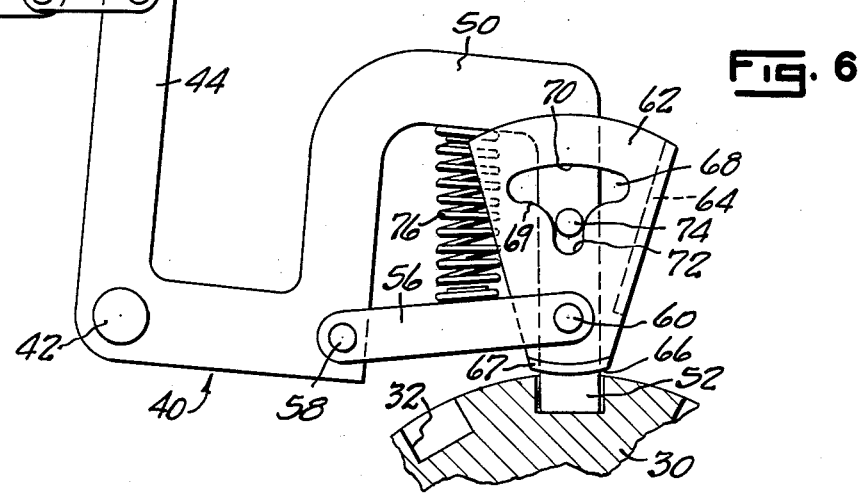

Dec. 27, 1960 C. G. SCHREYER 2,966,244
DEVICE FOR HOLDING AN AUTOMOBILE AGAINST MOVEMENT
Filed July 28, 1958 4 Sheets-Sheet 3
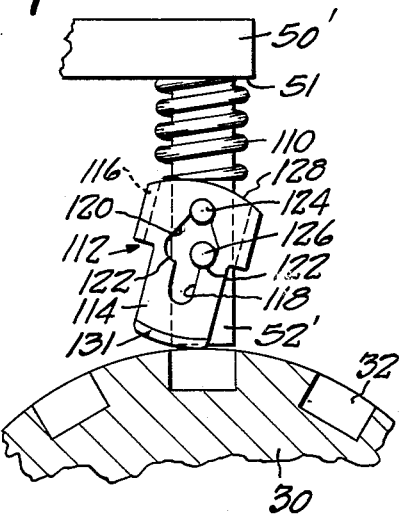
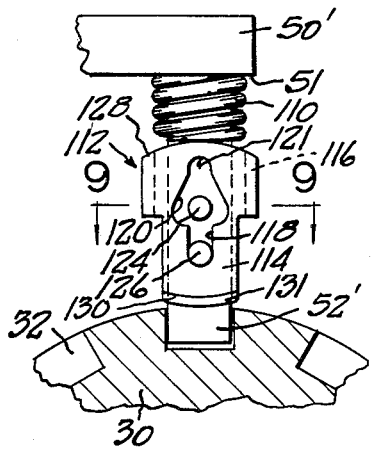
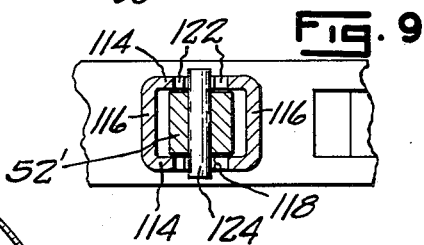
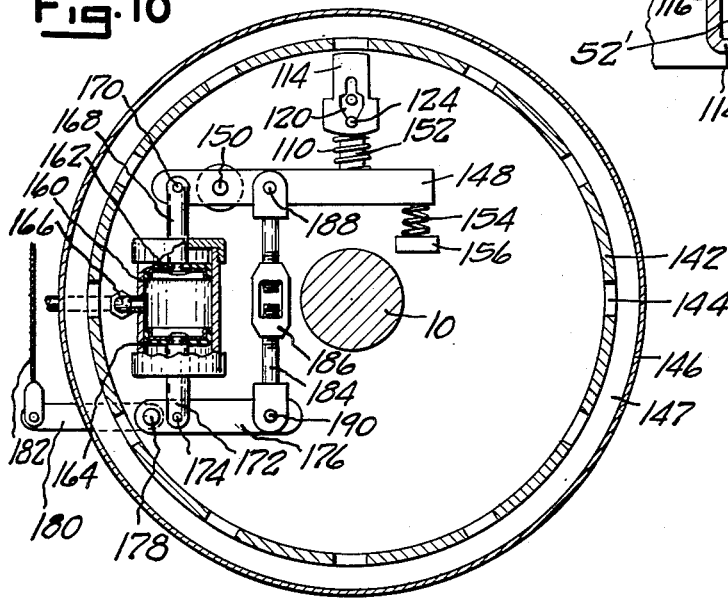
INVENTOR.
CHARLES G. SCHREYER.
BY
Eugene C. Knoblock
ATTORNEY Dec. 27, 1960    C. G. SCHREYER    2,966,244
DEVICE FOR HOLDING AN AUTOMOBILE AGAINST MOVEMENT
Filed July 28, 1958    4 Sheets-Sheet 4
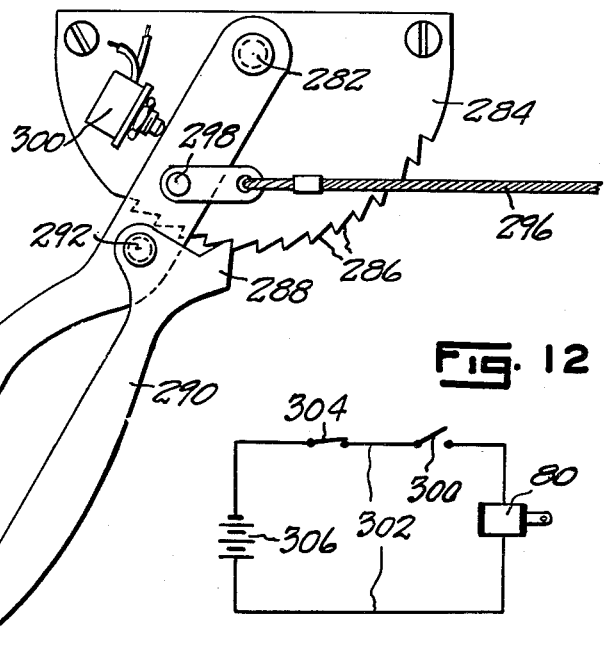
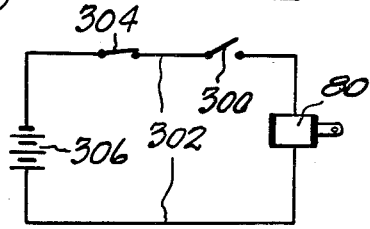
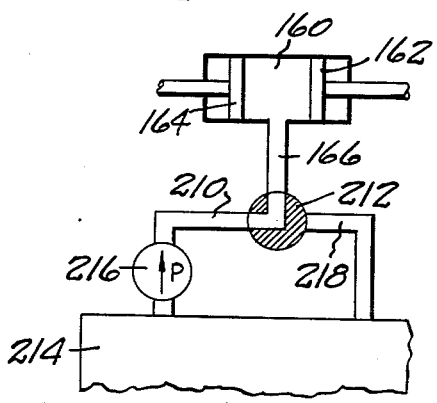
INVENTOR.
CHARLES G. SCHREYER.
BY
ATTORNEY

United States Patent Office 2,966,244
Patented Dec. 27, 1960

2,966,244

DEVICE FOR HOLDING AN AUTOMOBILE AGAINST MOVEMENT

Charles G. Schreyer, Morningside Hotel, South Bend 1, Ind.

Filed July 28, 1958, Ser. No. 751,249

10 Claims. (Cl. 192—3)

This invention relates to a device for holding an automobile against movement.

Many accidents are caused by automobiles which have been parked without applying a motion-retarding means, such as a parking brake or emergency brake, or in cases in which the parking brakes are ineffective because of wear or faulty condition thereof. Sometimes these accidents occur as a result of movement of the automobile by gravity when parked upon a grade. On other occasions the accident may occur as a result of propulsion imparted to the automobile by extraneous means while it is parked near a slope to which such propulsion moves the car, with the result that it gathers momentum and travels out of control when the driver is not seated in the car to operate the brakes.

The primary object of this invention is to provide a device which will function automatically whenever an automobile is stopped with the engine not operating, and which serves to prevent movement of the automobile from the selected stopped position.

A further object is to provide a device of this character controlled in response to the operation of an automobile engine for the purpose of disengaging the lock when the automobile engine is started.

A further object is to provide a device of this character having means for manually disengaging it to permit free movement of the automobile while being towed, or to disengage the lock when parts thereof do not function properly in response to engine operation.

Other objects will be apparent from the following specification.

In the drawings:

Fig. 1 is a fragmentary top view illustrating my device applied to the propeller shaft of an automobile;

Fig. 2 is a view of the device as seen from the left in Fig. 3, with the closure plate removed, and also illustrating a supplemental hand control associated with the device;

Fig. 3 is a fragmentary sectional view taken on line 3—3 of Fig. 2;

Fig. 4 is a fragmentary sectional view taken on line 4—4 of Fig. 2;

Fig. 5 is an enlarged view illustrating the locking lever in one operative position;

Fig. 6 is a view illustrating the locking mechanism in locking position;

Fig. 7 is a view illustrating a modified embodiment of the construction in a position comparable to the position shown in Fig. 5;

Fig. 8 is a view of the mechanism shown in Fig. 7 in its locking position;

Fig. 9 is a fragmentary detail sectional view taken on line 9—9 of Fig. 8;

Fig. 10 is a view similar to Fig. 2, illustrating a modified embodiment of the construction, with parts shown in section;

Fig. 11 is a view illustrating a hand control for the mechanism;

Fig. 12 is a wiring diagram of the device; and

Fig. 13 is a diagrammatic view of another modification of the invention.

Referring to the drawings, and particularly to Figs. 1 to 6 which illustrate one embodiment of the invention, the numeral 10 designates the propeller shaft of an automobile extending from any suitable drive transmission mechanism 12 interposed between the propeller shaft 10 and the automobile engine (not shown), said propeller shaft extending to the usual automobile differential gearing in the manner well understood in the art. The propeller shaft may be journaled to rotate in a tubular housing 14, as by means of bearings 16. An enlarged casing is carried by the tube 14 or the casing of the transmission 12, as may be desired. This housing includes an end wall or disk 18, an annular outer wall 20, and an opposed disk 22 removably mounted on the annular wall 20, as by means of securing screws 24 entering openings formed in enlarged ribs 26 in the annular wall 20.

A collar or disk 30 is mounted fixedly upon the propeller shaft 10 within the outline of the casing 18, 22 and preferably spaced between the end walls 18 and 22 thereof. The disk 30 is of a diameter greater than the shaft 10 but much smaller than the housing wall 20 so as to provide within the housing a substantial amount of free space. The disk 30 is provided with a series of substantially equally spaced recesses or pockets 32 formed in its periphery and spaced from the opposite side walls thereof so as to provide a pair of uninterrupted annular surfaces 34 at the periphery of the member 30.

A lever 40 is pivoted intermediate its ends to the plate 18 at 42. One end portion 44 of the lever has a coil spring 46 connected thereto and in turn anchored at a stop 48. The opposite end of the lever constitutes a gooseneck portion 50, as illustrated, and terminates in a substantially radially extending part 52 adapted to project into one of the recesses 32 of the disk 30 when in register therewith. The spring 46 normally urges the lever 40 in a direction to project its end part 52 into a disk recess 32.

A yoke 56 is pivoted at 58 to the gooseneck portion 50 of the lever spaced from the lever part 52. This gooseneck in turn has pivotally connected thereto at 60 the side walls 62 of a shoe member of U-shape in cross-section. The shoe has an end wall 64 connecting the two side walls 62, and the two side walls 62 are preferably of tapered shape and are provided with curved lower edges 66 adapted to ride upon the surfaces 36 of the disk 30 and preferably carry friction surfacing material 67. Each side wall of the shoe has formed therein spaced above the pivot 60 thereof with the yoke 56 a substantially T-shaped slot 68 having an upper elongated transverse edge 70 substantially concentric with the axis of the pivot 60 and having a longitudinal portion 72 extending toward the pivot 60. A pin 74 carried by the lever part 52 projects from the opposite sides thereof and extends into the T-slots 60 in the shoe walls 62. A coil spring 76 is interposed between the central portion of the gooseneck 50 of the lever 40 and the yoke 56 to normally urge the shoe to a position wherein the pin 74 rides upon the transverse edges 70 of the T-slots 68.

Any means responsive to the operation of an automobile engine may be provided for the purpose of operating the lever 40 against the action of the spring 46. In Fig. 2 is illustrated an electrical solenoid 80 having leads 82 connected to the ignition circuit of an automobile to energize the solenoid when the ignition circuit is closed for the purpose of starting the engine and deenergizing the solenoid when the ignition circuit is deenergized. The solenoid 80 is connected to the lever portion 44 in opposition to the spring 46 as by means of a link 84.

The solenoid, when energized, exerts sufficient pull upon the lever to overcome the action of the spring 46 during engine operation and to seat the lever against a stop 86, with the lever part 52 and the shoe 62 spaced from and clear of the disk 30, as illustrated in Figs. 2 and 3.

Fig. 2 constitutes the position of the parts during the time that the automobile engine is operating, and it will be observed that in this condition no restraint upon free rotation of the propeller shaft is exerted by the device. When the automobile ignition system is deenergized, the spring 46 comes into play to swing the lever 40 clockwise, as illustrated in Figs. 2, 5 and 6, thereby bringing the friction members 67 of the shoe 62 into engagement with the disk 30. In this connection it may be mentioned that the spring 76 in pressing the shoe 62 inwardly toward the shaft 10 relative to the gooseneck 50 insures that the inner edges 66 of the shoe project beyond the inner end of the lever part 52 so as to insure contact of the shoe with the disk 30 before the lever 52 contacts the disk. The frictional engagement of the shoe 62 with the rotating disk 30 swings the shoe to the position illustrated in Fig. 5 tilted relative to the lever part 52 if the member 30 is still rotating at the time that the solenoid or other actuator 80 for the lever is deenergized. This action serves to cause the pin 74 to seat in one end of the outer part of the T-slot 68 against the edge 70 in such a manner as to prevent movement of the lever 52 toward the disk 30 as long as the rotation of the disk 30 continues. In other words, the pin 74 seats against one of the shoulders 69 formed by the slots 68 and prevents the spring 46 from projecting the lever part 52 into engagement with the disk 30 while the latter moves as would normally be possible by reason of the fact that the spring 46 is stronger than the spring 76.

As soon as the member 30 comes to rest the strong spring 46 overpowers spring 76 and causes the pin 74 to slide along the adjacent shoulder 69 which previously obstructed its movement. This cams the member or shoe 62 to the position shown in Fig. 6 and therefore permits the free end portion 52 of the lever to come into contact with the member 30. In the event the member 52 comes to rest at a position in alignment with a recess 32, the lever end 52 is projected into said recess, as illustrated in Fig. 6. This provides a positive lock preventing rotation of the shaft 10 until the next operation of the actuator 80 brought about upon restarting of the automobile engine. The locking of the propeller shaft in this manner insures against any undesired movement of the automobile. In the event the end of lever part 52 does not register with one of the recesses 32 of the member 30, the end of lever part 52 will be spring-pressed against the member 30 between adjacent recesses 32. If, then, any movement of the automobile should commence, a slight turning of the automobile wheels will result in rotation of the propeller shaft 10 until a recess does register with the lever 52 so as to permit lever 52 to be projected by spring 46 into the first recess 32 which registers therewith. Inasmuch as this action will occur before the automobile gains momentum, no injury to the device will occur as a result of stopping of the propeller shaft and the automobile in this manner.

Inasmuch as the device operates automatically whenever the automobile engine is deenergized and normally remains so until the engine is re-started, it is important to provide means by which it may be selectively released at the will of the operator. One such means is illustrated in Fig. 2 wherein a cable 90 is connected to the portion 44 of the lever and extends to an actuator 92 mounted upon the dash or instrument panel 94 of the automobile. As here shown, the cable 90 extends through a flexible tube 96. It will be observed that a pull upon the hand grip 98 will urge the latter to the dotted line position shown in Fig. 2, thereby swinging the lever 44 in a direction to overcome the operation of the spring 46.

It is desirable that any abnormal deenergizing of the apparatus shall be apparent to an operator, and for this purpose a signal light 100 may be mounted upon the instrument panel 94 under the control of a switch 102 having a spring-urged actuator 104 positioned in the path of an abutment 106 carried by the member 92. The switch will preferably be so arranged that in the normal position of the parts when the cable 90 is slack and the device is free to operate in a manner explained above, the light 100 will be deenergized. However, when the hand pull 98 is employed to draw the cable 90 to a position overcoming the spring 46 and maintaining the lever out of operative position, the switch 104 will be operated by the abutment 106 to energize the light 100 and signal the inoperative condition of the device to the driver.

A modification of the construction of the lever 40 and of the shoe is illustrated in Figs. 7, 8, 9. In this construction the lever part 52' projects from the lever part 50' in a manner to provide a shoulder 51 at the junction between these parts, serving as an abutment for one end of a coil spring 110 encircling part 52'. The opposite end of spring 110 bears against the end of a foot member 112. The foot member 112 preferably has opposed side portions 114 and opposed end portions 116. Portions 116 are spaced apart a distance greater than the width of the member 52' and are of a length short compared to the length of the side members 114. Members 114 are spaced apart sufficiently to have sliding clearance with the member 52'. Each of the side members 114 has a keyhole slot therein including an inner narrow longitudinal slot portion 118 extending centrally, and an enlarged outer tapered end portion 120 providing opposed shoulders 122 between the same and the slot portion 118. A pair of pins 124 and 126 are carried by the lever part 52' spaced a distance equal to the spacing between the shoulder 122 and the apex 121 of the slot portion 120 when said spacing is measured with respect to the surface portions of said pins which are at the greatest distance from one another. The top edges 128 of the sides 114 of the shoe are preferably arcuate and substantially concentric with the pin 126 when the latter seats at the end of the slot part 118, as illustrated in Fig. 8. The edge 130 of each side 114 of the shoe adjacent disk 30 is arcuate and preferably concentric with the outer pin 124 when the latter seats at the apex 121 of the slot. Friction material 131 is preferably carried by the shoe edges 130.

The construction shown in Figs. 7 and 8 functions in the same manner as the construction previously described. Specifically, in the normal inoperative condition of the device, the spring 110 presses the shoe inwardly so that the end portion 121 of the slot engages the pin 124, and the free end portion of the lever 52' is positioned within the outline of the shoe. Upon pivoting of the lever 40 toward the member 30, the surface 130 of the shoe engages the member 30 and, if the member 30 is still rotating at that time, the shoe is tilted to the position shown in Fig. 7 to cause the pin 126 to seat at one of the shoulders 122 and prevent the lever 52' from contacting the disk 30 or from seating in one of the recesses 32 thereof. As soon as the member 30 comes to a stop, the force of the spring 46 overcomes the force of the spring 110 with the result that the pin 126 slides on the shoulder 122 to cam the shoe into alignment with the lever part 52' and permit the pin 126 to enter the slot portion 118 incident to movement of the lever portion 52' toward member 30, so as to enter one of the recesses 32, as illustrated in Fig. 8, if a recess registers with inner part 52'. In the preferred arrangement the length of the slot portion 118 relative to the spacing between pins 124 and 126 is such that, when the pin 126 seats at the end of the slot portion 118, the pin 124 fits freely in the enlarged portion 120 of the slot.

The device can be constructed to respond to engine operation and to operate upon some part other than a collar or disk carried by the propeller shaft 10. Such an alternate construction is illustrated in Fig. 10, wherein the propeller shaft carries a disk having a circular outer wall 142 interrupted by a series of spaced holes 144. This unit may be mounted within an outer casing 146.

A lever 148 is pivoted at 150 intermediate its ends, as to a side wall 147 of the housing 146. A lever arm 152, similar to the lever arm 52' shown in Figs. 7, 8 and 9, is carried by the lever 148 and mounts thereon a shoe of the same construction illustrated in Figs. 7, 8 and 9, said shoe being pressed upon by a coil spring 110 encircling lever part 152 to press the shoe to the position shown wherein pin 124 seats at the end 121 of slot 120 of the shoe 14, when clear of the circular wall 142 and positioned therein. A coil spring 154 bears against an abutment 156 on the wall 147 and presses lever 148 toward the circular wall 142, said spring 154 being of a strength greater than the spring 110.

A fluid pressure cylinder 160 is mounted upon the casing wall 147 and has a pair of opposed pistons 162 and 164 mounted therein. A line 166, in the nature of a fluid conduit, communicates with the center portion of the cylinder 160 and extends to a pump, such as an oil pump, driven by the engine of the automobile so as to generate pressure to separate the pistons 162, 164 whenever the automobile engine operates. A piston pin 168 carried by the piston 162 is pivoted at 170 to the lever 148 at the end thereof opposite that engaged by the spring 154. Thus whenever the engine operates, the piston 162 overpowers the spring 154 to retract the lever part 152 and allow free rotation of the propeller shaft.

In the preferred construction, the piston 164 carries a piston pin 172 which is pivoted at 174 to a lever 176 pivoted to the housing wall 147 at 178 and preferably mounting exteriorly of the mechanism a lever arm 180 to which cable 182 is connected for the purpose of overcoming the action of the spring 154 while the automobile engine is inoperative. Lever 176 is connected to lever 148 by a link 184 which is preferably extensible, as by means of a turnbuckle. 186. Pivot 188 connects one end of the link 184 to the lever 148 between the pivot 150 and the spring 154 and preferably spaced from the pivot 150 substantially the same distance as the pivot 170 of the piston arm 168 is spaced from the pivot 150. The opposite end of the link 184 is pivoted to the lever 176 at 190. It will be apparent that this embodiment of the invention functions in substantially the same manner as that previously described. It is interesting to observe further that the use of the dual pistons 162, 164 makes it possible to employ a cylinder of minimum diameter since the two pistons act cumulatively upon the lever 148. Thus, when the piston 162 moves upwardly as viewed in Fig. 10, it acts to pivot the lever 148 in a clockwise direction. At the same time downward movement of the piston 164 swings the lever 176 in a clockwise direction, and this action is transmitted to the lever 148 as a pull supplementing the pushing action imparted to the lever 148 at 170.

It will further be apparent that whether the shoe 114 rides along the interior of the wall 148 or along the exterior of a collar or cylinder is immaterial, and the same blocking function is exerted in both cases. Likewise, it will be apparent that a pull on the cable 182 when the cylinder is deenergized will overcome the action of the spring 154 and tend to pull the locking part 152 of the lever clear of the opening 144 in the wall 142 in which it is seated.

Figures 11 and 12 disclose an arrangement which makes possible the proper functioning of the device in response to the operation of a hand brake lever. The hand brake lever may be of the conventional character having a lever member 280 pivoted at 282 to a sector plate 284 having a plurality of notches or teeth 286 in its edge engageable by a detent 288 on a grip member 290 pivoted at 292 to the lever 280 and normally urged by spring 294 to a position in which the detent 288 engages one of the sector notches 286. A brake-operating cable 296 of conventional construction is connected to the handle or lever 280 at 298. This construction is conventional. My improvement consists of mounting a switch member 300 upon the sector plate 284 in a position to be engaged by the brake lever 280. Switch 300 is preferably of the normally closed type which is opened when engaged by the lever 280. The switch 300 is connected in series in the circuit 302 along with the ignition switch 304 and the battery 306. This is the circuit in which the solenoid 80 is connected.

By connection of a switch 300 in this fashion associated with a parking or hand brake, assurance can be had that the device will function even though an operator carelessly leaves his engine running or leaves the car with the engine inoperative but with the ignition switch closed. In other words, if the operator leaves the car in either of these conditions, but does operate the hand brake lever, that hand brake lever breaks the circuit of the solenoid 80, deenergizing that solenoid and permitting the spring 46 to function for the purpose of actuating the locking device in the manner described above. In other words, this construction makes it possible to insure that the car will not travel even where parking brakes are faulty but are applied when a user leaves the car with the engine idling. Likewise, the construction prevents operation of the automobile with the hand brake set.

A similar safety feature for non-electrically operated devices, such as that shown in Fig. 10, may be provided, and an example of such a device is shown schematically in Fig. 13. In this construction the line 166 leading to the cylinder 160 is connected to a by-pass line 210 connected to the oil sump or reservoir of engine 214. A valve 212 is interposed in by-pass 210 at the junction of the line 166 therewith. The by-pass 210 may have a pump 216 interposed therein and driven by the engine so as to supply fluid under pressure to the cylinder 160 when the valve 212 is adjusted in the position illustrated in Fig. 13. The other portion 218 of the by-pass is closed during this setting of the valve 212. It will be apparent, however, that a 90 degree change of position of the valve 212 will connect the line 166 with the return line 218 serving to block the flow of fluid from the pump 216 to the cylinder 160 and thereby permitting the spring 154 of the construction shown in Fig. 10 to come into play for the purpose of actuating the locking device. The valve 212 may be connected to the brake lever, such as the lever 280 shown in Fig. 11, to be actuated thereby when the hand brake is set. Thus it becomes apparent that even though the engine is running, the cylinder 160 in Fig. 13 can be deenergized to permit the device of Fig. 10 to lock the car against movement when the hand brake is set.

While the preferred embodiments of the invention have been illustrated and described, it will be understood that changes in the construction may be made within the scope of the appended claims without departing from the spirit of the invention.

I claim:

1. An automotive parking lock for an automobile having an internal combustion engine, an ignition system and a propeller shaft, comprising a circular member carried by said shaft and having a circular series of spaced openings therein, a lever pivoted to a fixed support and adapted in one position to seat in one of said openings, means responsive to operation of said engine for positioning said lever clear of said member, biasing means normally urging said lever toward a position to seat in one of said openings, said biasing means being overpowered by actuation of said engine responsive means and means responsive to rotation of said shaft for positioning said lever clear of said openings when said engine is not operating.

2. An automotive parking lock for an automobile having an internal combustion engine, an ignition system and a propeller shaft, comprising a circular member carried by said shaft and having a circular series of spaced openings therein, a lever pivoted to a fixed support and adapted in one position to seat in one of said openings, means responsive to operation of said engine for positioning said lever clear of said member, biasing means normally urging said lever toward a position to seat in one of said openings, said biasing means being overpowered by actuation of said engine responsive means, said engine responsive means constituting a solenoid connected in said ignition system and connected to said lever and means responsive to rotation of said shaft for positioning said lever clear of said openings when said engine is not operating.

3. An automotive parking lock for an automobile having an internal combustion engine, an ignition system and a propeller shaft, comprising a circular member carried by said shaft and having a circular series of spaced openings therein, a lever pivoted to a fixed support and adapted in one position to seat in one of said openings, means responsive to operation of said engine for positioning said lever clear of said member, biasing means normally urging said lever toward a position to seat in one of said openings, said biasing means being overpowered by actuation of said engine responsive means, said engine responsive means constituting a fluid pressure member connected to said lever, means responsive to operation of said engine for supplying fluid pressure to said last named member and means responsive to rotation of said shaft while said engine is deenergized for preventing seating of said lever in an opening.

4. An automotive parking lock for an automobile having an internal combustion engine, an ignition system and a propeller shaft, comprising a circular member carried by said shaft and having a circular series of spaced openings therein, a lever pivoted to a fixed support and adapted in one position to seat in one of said openings, means responsive to operation of said engine for positioning said lever clear of said member, biasing means normally urging said lever toward a position to seat in one of said openings, said biasing means being overpowered by actuation of said engine responsive means, and a shoe shiftably carried by said lever and responsive to rotation of said propeller shaft when said engine responsive means is deenergized to prevent seating of said lever in one of said openings, said biasing means shifting said shoe to lever-releasing position when said circular member is stationary.

5. An automobile parking lock for an automobile having an internal combustion engine, an ignition system and a propeller shaft, comprising a circular member carried by said shaft and having a circular series of spaced openings therein, a lever pivoted to a fixed support and adapted in one position to seat in one of said openings, means responsive to operation of said engine for positioning said lever clear of said member, biasing means normally urging said lever toward a position to seat in one of said openings, said biasing means being overpowered by actuation of said engine responsive means, a shoe shiftable endwise and laterally rockable on said lever, said shoe normally projecting from said lever toward said member, and interengaging locking means carried by said shoe and lever and responsive to rocking of said shoe upon engagement with said member while rotating to prevent movement of said lever toward said member.

6. An automotive parking lock for an automobile having an internal combustion engine, an ignition system and a propeller shaft, comprising a circular member carried by said shaft and having a circular series of spaced openings therein, a lever pivoted to a fixed support and adapted in one position to seat in one of said openings, means responsive to operation of said engine for positioning said lever clear of said member, biasing means normally urging said lever toward a position to seat in one of said openings, said biasing means being overpowered by actuation of said engine responsive means, a shoe slidable and rockable on said lever, means normally projecting said shoe beyond the end of said lever toward said member, and a pin and slot connection between said lever and shoe, said slot having a shoulder engageable by a pin to prevent sliding of said shoe on said lever when said shoe is rocked relative to said lever by contact with said member while rotating.

7. An automotive parking lock as defined in claim 6, wherein said shoulder constitutes a cam, said biasing means overpowering said shoe projecting means whereby said pin traverses said cam shoulder to permit sliding of said lever relative to said shoe and into engagement with said member when said member is stationary and said engine responsive lever positioning means is deenergized.

8. An automotive parking lock for an automobile having an internal combustion engine, an ignition system and a propeller shaft, comprising a circular member carried by said shaft and having a circular series of spaced openings therein, a lever pivoted to a fixed support and adapted in one position to seat in one of said openings, means responsive to operation of said engine for positioning said lever clear of said member, biasing means normally urging said lever toward a position to seat in one of said openings, said biasing means being overpowered by actuation of said engine responsive means, manually operable means for releasing said lever from said member independently of said engine responsive means, and means responsive to rotation of said shaft for locking said lever clear of said member while the engine is not operating.

9. An automotive parking lock as defined in claim 1, for an automobile having an instrument panel, and a cable connected to said lever and terminating adjacent said instrument panel, said cable being selectively manually operable to disengage said lever from said member independently of said engine responsive means.

10. An automotive parking lock as defined in claim 1, wherein said engine responsive means constitutes an electrical member electrically connected in said ignition system, and an automotive wheel brake actuator, and a switch in said ignition system responsive to the position of said wheel brake actuator.

References Cited in the file of this patent

UNITED STATES PATENTS

| | | |
|---|---|---|
| 1,876,498 | Hawkins | Sept. 6, 1932 |
| 1,972,300 | Hemingway | Sept. 4, 1934 |
| 1,976,471 | Adams | Oct. 9, 1934 |
| 2,009,862 | Spell | July 30, 1935 |
| 2,072,764 | McCoy | Mar. 2, 1937 |
| 2,100,970 | MacMullen | Nov. 30, 1937 |
| 2,245,958 | Barr et al. | June 17, 1941 |
| 2,457,729 | Roberts et al. | Dec. 28, 1948 |
| 2,537,514 | Curtiss | Jan. 9, 1951 |
| 2,797,780 | Wemp | July 2, 1957 |